United States Patent [19]

Nozaki et al.

[11] Patent Number: 4,963,383
[45] Date of Patent: Oct. 16, 1990

[54] PROCESS FOR PRODUCING KONJAK JELLY

[75] Inventors: Hisashi Nozaki; Seiya Sakurai, both of Saitama, Japan

[73] Assignees: Kabushikikaisha Kibun, Tokyo; Kabushikikaisha Kyowashokuhin, Saitama, both of Japan

[21] Appl. No.: 229,174

[22] PCT Filed: Nov. 13, 1987

[86] PCT No.: PCT/JP87/00881
§ 371 Date: Jul. 13, 1988
§ 102(e) Date: Jul. 13, 1988

[87] PCT Pub. No.: WO88/03760
PCT Pub. Date: Jun. 2, 1988

[30] Foreign Application Priority Data

Nov. 19, 1986 [JP] Japan .................................. 61-274175
Nov. 19, 1986 [JP] Japan .................................. 61-274176
Nov. 19, 1986 [JP] Japan .................................. 61-274177

[51] Int. Cl.$^5$ .............................................. A23L 1/528
[52] U.S. Cl. ..................................... 426/573; 426/658; 426/804; 426/656
[58] Field of Search ............... 426/660, 573, 804, 575, 426/658, 573, 656

[56] References Cited

U.S. PATENT DOCUMENTS 4,582,714  4/1986  Ford et al. ........................... 426/565
4,676,976  6/1987  Toba et al. ........................... 426/573

FOREIGN PATENT DOCUMENTS 58116651   7/1983  Japan .
0221054  11/1985  Japan .
1231963  10/1986  Japan .................................. 426/573

Primary Examiner—Jeanette Hunter
Attorney, Agent, or Firm—Browdy and Neimark

[57] ABSTRACT

A process for producing a konjak (a substance made from the starch of the corms of the plant *Amophorphallus Rivievi*) jelly which may be added to various kinds of food is disclosed. The konjak jelly is produced by adding water to konjak flour to cause the latter to swell and dissolve in the former, and mixing the resulting paste with a basic amino acid, a basic salt, or a mixture thereof; or adding to konjak flour water which has been mixed with a basic amino acid, a basic salt, or a mixture thereof in advance; or mixing konjak flour with a basic amino acid, a basic salt, or a mixture thereof in advance, and adding water to the resulting mixture to cause the latter to swell and dissolve in the former; and heating the resulting konjak paste under alkaline conditions and then cooling it. The konjak jelly thus produced may be added to various kinds of food to improve the flavor or the like or may be added to diet food. Thus, it is possible to diversify the use of konjak.

20 Claims, No Drawings

PROCESS FOR PRODUCING KONJAK JELLY

TECHNICAL FIELD

The present invention relates to a process for producing a konjak (a substance made from the starch of the corms of the plant Amophorphallus Rivievi) jelly which is suitable as a method of diversifying the utilization of konjak, for example, by adding it to various kinds of food with a view to improving their flavor or other properties, or to various kinds of diet food for calorie control purposes.

BACKGROUND ART

Although it has been utilized as a food from ancient times, konjak has recently attracted special interest and has been put in the spotlight because of its non-calorie properties and its usefulness as dietary fiber.

However, konjak is in most cases used in the form of a slab or the like, e.g. in firm gel form in which shape it is usually eaten, so that konjak has not yet been satisfactorily utilized as a processed food material which may be added to a food in order to give it a unique flavor or improve its properties, or which may be utilized as a binder or for calorie control purposes.

The reason for this may be attributed to the slow development of a technique by which a konjak raw material, for example, konjak flour, may be formed into good quality processed food materials or food additives.

More specifically, according to a typical conventional process for producing konjak, 900 to 1200 liters of water is added to about 30 kg of konjak flour, allowing the latter to swell and thus preparing konjak paste, after which lime is added to and mixed with the konjak paste in an amount of 3 to 6% with respect to the amount of konjak flour.

Then, the mixture is placed in a container, forming frame or the like and heated at about 80° C. for about 60 minutes to thereby obtain a piece of konjak in firm gel form. This method has been practiced for many years.

Accordingly, if one is to use konjak flour as a food material for addition to another processed food or the like, it is conventional practice to add konjak flour in the form of a finely-ground powder with a view to facilitating dissolution, or in the form of konjak paste which is formed by making konjak flour swell by addition of water or by mixing lime with konjak flour.

PROBLEMS TO BE SOLVED BY THE INVENTION

These conventional methods suffer, however, from the following problems Namely, mannan originated from konjak does not completely set to gel even in the final-product stage, and the pasty state that is retained is rather undesirable. The smell of slaked lime which is used as a solidification agent for konjak paste unfavorably remains. Since the pH of the product inclines toward the alkali side, the taste may be adversely affected.

Accordingly, although it is desired to use a larger amount of konjak in order to improve the properties of food or provide for calorie control, the amount of konjak which is usable is to a substantial extent limited.

In these circumstances, the present inventors made exhaustive studies in order to develop food additives and processed food materials that could be produced with konjak and which are free from the above-described problems, as well as eliminating any risk that the ingredients which constitute the konjak may separate from each other or that water may be irreversibly liberated from solid matter during storage over long periods of time.

DISCLOSURE OF THE INVENTION

As a result, the present inventors have succeeded in processing a konjak raw material to produce a konjak material in a jelly-like form, i.e. the form of a thermally irreversible, thickened gel, which may conveniently be added to food be processed, thus attaining the above-described object.

More specifically, the present invention provides a process for producing a konjak thickened gel comprising the steps of: adding water to konjak flour to cause the latter to swell and dissolve in the former, and mixing the resulting paste with a basic amino acid, a basic salt, or a mixture thereof; or adding to konjak flour water which has been mixed with a basic amino acid, a basic salt, or a mixture thereof in advance; or mixing konjak flour with a basic amino acid, a basic salt, or a mixture thereof in advance, and adding water to the resulting mixture to cause the latter to swell and dissolve in the former; and heating the resulting konjak paste under alkaline conditions and then cooling it.

The konjak jelly or thickened gel according to the present invention is different from the so-called konjak paste which is formed by allowing konjak flour to swell in water, and is also different from the konjak firm gel which is obtained by adding an alkali to konjak paste and heating the mixture. The konjak jelly of the present invention is midway between konjak paste and firm gel from the viewpoint of properties.

Accordingly, the konjak jelly of the present invention possesses viscosity and hardness at appropriate levels and may therefore be mixed with any kind of food in desired proportions.

Unlike mere konjak paste, the konjak thickened gel according to the present invention when heated during the processing of a food containing it can further gel and set completely.

It should be noted that there is a "reversible-state konjak" disclosed in Japanese Patent Public Disclosure No. 58-116651 (1983) which is likely to be confused with the konjak jelly of the present invention. However, the prior art is a form of konjak which reversibly changes from a liquid state to a coagulated state and vice versa in accordance with the degree of cooling and heating applied, and therefore it is clearly different in terms of properties from the thermally irreversible konjak jelly of the present invention which is in the thickened gel state irrespective of whether it is cooled or heated.

The following is a description of the process for producing the konjak jelly or the thickened gel according to the present invention.

Water is first added to konjak flour in an amount equivalent to 20 to 40 times the amount of the latter, thereby causing the konjak flour to swell and dissolve in the water and thus obtaining konjak paste. Then, a basic amino acid, a basic salt, or a mixture thereof is added to and intimately mixed with the konjak paste. Alternatively, a basic amino acid, a basic salt, or a mixture thereof is first mixed with an amount of water equivalent to 20 to 40 times the amount of konjak flour used, and then the konjak flour is allowed to swell and dissolve in the solution. According to still another procedure, konjak flour is first mixed with a basic amino acid, a basic salt, or a mixture thereof, and then an amount of water which is 20 to 40 times the amount of konjak flour is added to and mixed with the resulting mixture, thereby allowing the konjak flour to swell and dissolve in the mixture. In all three procedures, the konjak paste thus prepared is heated under alkaline conditions and then cooled to thereby obtain the desired thickened gel.

It should be noted that the temperature and duration of the heat treatment are adjusted in accordance with the concentration and pH of the salt used and the desired properties of the thickened gel to be obtained. When the pH of the konjak paste is relatively high, the heating time is set so as to be relatively short, whereas, when the pH of the paste is relatively low, the heating time is set so as to be relatively long.

To obtain the thickened gel according to the present invention, the konjak paste must be heated under alkaline conditions. It is preferable to carry out the heat treatment with the pH of the konjak paste adjusted so that the pH of the thickened gel obtained after cooling is in the range of from 8.0 to 10.5, preferably from 8.2 to 10.0.

In this case, it is preferable to select a combination of heating conditions such that the temperature is from 60 to 95° C. and the heating time is from 5 to 210 minutes.

It should be noted that a desirable combination of pH, temperature and heating time is preferably selected so that the pH of the thickened gel obtained after cooling is in the range of from 8.0 to 10.5, preferably from 8.2 to 10.0, and it is preferable to determine optimal combination conditions for these factors in advance by carrying out preliminary experiments.

The heat treatment used in the present invention is completed before the konjak paste sets. If the heating conditions exceed the upper limit of the optimal range, the konjak paste sets to a firm gel and loses its mixability with other ingredients which is one of the advantageous features of the konjak jelly or thickened gel according to the present invention. On the other hand, if the heating conditions are lower than the lower limit of the optimal range, the paste cannot set to a thickened gel when the konjak paste is reheated, but remains in the pasty state. This results in a food material that is nothing more than a konjak paste swelling in water.

Once the konjak paste which has been appropriately heated, it must be cooled quickly to stop the reaction. If this operation is omitted, the paste undesirably becomes a firm gel.

The pH of the konjak jelly or thickened gel thus obtained is in the range of from 8.0 to 10.5, preferably in the range of from 8.2 to 10.0. A pH value in excess of 10.5 results in an ordinary type of konjak firm gel which is difficult to mix with other foods. A pH value of less than 8.0 is unfavorable because, when such a konjak jelly is mixed with other foods, the jelly remains in the pasty state and will not solidify, which degrades the commercial value of the resulting food product.

As described above, the konjak jelly or thickened gel of the present invention has different properties from those of the aforementioned reversible-state konjak (see Japanese Patent Public Disclosure No. 58-116651) although both products are formed by carrying out similar procedures. This is partly attributable to the difference in the heating conditions.

More specifically, it is clear that the reversible-state konjak is gelled or coagulated at 80° C., and the difference in the properties arises from the absence of a cooling process in the procedure.

As described above, the pH of the konjak mixture during the production process is adjusted so that the pH of the resulting thickened gel is in the range of from 8 to 10.5. In other words, the konjak material is processed within a lower pH region than in the case of the process for producing ordinary konjak firm gel. Thus, the process according to the present invention is also different from the conventional konjak production process. Although ordinary konjak firm gel can also be produced in the pH region of from 9.5 to 10.0 by appropriately setting the heating and cooling conditions, in the present invention the heating conditions are set at lower levels than in the case of the ordinary konjak firm gel production process. The heating is stopped before the konjak paste sets to a firm gel, and the heated konjak paste is immediately cooled to obtain a konjak jelly or thickened gel.

As for the konjak raw material to be employed in the present invention, it is possible to use any of the following materials, that is konjak flour obtained by drying and grinding konjak, and refined konjak flour.

Examples of basic amino acids which may usually be employed in the present invention include arginine, histidine, lysine, citrulline and ornithine. These basic amino acids may be employed alone or in combination in the form of a mixture. Particularly preferable basic amino acids are arginine and lysine.

The amount of a basic amino acid used is preferably from 1.25 to 15% by weight with respect to the weight of konjak flour used.

Employment of a basic amino acid enables utilization of the advantage offered by basic amino acids in that they have high pH-buffering power whereby it is possible to stabilize the pH of the konjak paste and obtain a konjak jelly or thickened gel having stable quality. In addition, it is advantageously possible to obtain a tasty konjak jelly which is free from alkaline flavor even though it is in fact alkaline.

Examples of basic substances which may be employed in the present invention usually include organic acid salts such as sodium citrate, sodium tartrate, sodium malate, sodium acetate, sodium lactate and sodium succinate, phosphates such as sodium polyphosphate, sodium pyrophosphate, sodium metaphosphate, di- or tri-sodium phosphate, potassium polyphosphate, potassium pyrophosphate, potassium metaphosphate, and di- or tri-potassium phosphate, carbonates such as sodium carbonate, sodium hydrogencarbonate, potassium carbonate, calcium carbonate, and magnesium carbonate, sulfates such as potassium sulfate, sodium sulfate, calcium sulfate, and magnesium sulfate, sodium hydroxide, and potassium hydroxide. As will be clear from these examples, any basic edible salt may be employed as a basic salt in the present invention.

It should be noted that in order to provide a buffer effect it is possible to employ an acid or an acid salt in combination with a basic substance such that the pH of the combination is eventually on the alkali side. Examples of acids or acid salts which may be employed in combination with a basic substance are citric acid, tartaric acid, malic acid, acetic acid, lactic acid, phosphoric acid, monosodium phosphate, and monopotassium phosphate. The amount of acid or acid salt used is preferably from 0.01 to 5% by weight with respect to the weight of konjak flour used.

In the present invention, employment of a basic amino acid and basic salt in combination enables effective combination of the characteristics of basic amino acids, which have high pH-buffering power and therefore enable stabilization of the pH value but cause difficulties in setting a desired pH value, and the characteristics of basic salts, which are such that it is possible to adjust the pH value as desired by selection of an appropriate substance even though the pH-buffering power of basic salts is relatively low. Thus, it is possible to facilitate the pH setting operation, suppress fluctuations in pH due to the raw material and water used, and produce a uniform konjak jelly or thickened gel.

The konjak jelly according to the present invention has the following advantages. It is possible to add this konjak jelly to various kinds of food for calorie control purposes. The konjak jelly may be added to processed marine foods and processed meat foods to improve the taste, flavor, water holding capacity, etc., and may also be added to noodles such as Chinese noodles and wheat vermicelli to improve their flavor and other properties or to be utilized as a binder therefor. Further, the konjak jelly or thickened gel may be added to dough for bread or cookies to improve their flavor, expanding characteristics and other properties.

Further, the konjak jelly or thickened gel may be used for fruit jelly foods, for example, jam and pastry, by adding sweetening, spices or the like thereto.

EXAMPLES

The following Examples are provided for the purpose of further illustrating the present invention but are not to be construed as limiting.

Example 1

One hundred liters of water having 0.35 kg of L-arginine dissolved therein was added to 4 kg of refined konjak flour under stirring so that the konjak flour swelled in water. The resulting konjak paste was then allowed to stand for 5 hours at room temperature, thereby satisfactorily effecting swelling and dissolution of the konjak flour. The pH of the resulting konjak paste was 8.9.

The konjak paste thus obtained was packed and sealed in a bag made of a synthetic resin material and then heated at 75° C. for 90 minutes. After the heat treatment, the packed konjak paste was cooled rapidly to 10° C. in ice water, thereby obtaining the desired konjak thickened gel. The pH of the thickened gel thus obtained was 8.6.

Example 2

One hundred liters of water was added to 3.5 kg of refined konjak flour under stirring so that the konjak flour swelled in water. The resulting konjak paste was then allowed to stand for 3 hours at room temperature, thereby satisfactorily effecting swelling and dissolution of the konjak flour.

A solution of 0.7 kg of L-lysine in 7 liters of water was added to and intimately mixed with the resulting konjak paste. The pH of this mixture was 9.6.

The paste thus obtained was packed and sealed in a bag made of a synthetic resin material and then heated at 90° C. for 30 minutes. After the heat treatment, the packed konjak paste was cooled in running water and further cooled to 10° C. in ice water, thereby obtaining the desired konjak jelly. The pH of the konjak jelly or thickened gel thus obtained was 9.2.

Example 3

One hundred liters of water having 0.5 kg of trisodium phosphate dissolved therein was added to 4 kg of refined konjak flour, and the mixture was stirred for 5 to 10 minutes so that the flour swelled in water. The resulting konjak paste was then allowed to stand for 3 hours, thereby satisfactorily effecting swelling and dissolution of the konjak flour.

The konjak paste thus obtained was packed in a bag made of a synthetic resin material. The pH of the paste was 9.4. The packed paste was then heated at 75° C. for 30 minutes. Immediately after completion of the heat treatment, the packed konjak paste was cooled in running water and further cooled to 10° C. in ice water, thereby obtaining the desired konjak jelly or thickened gel. The pH of the konjak jelly thus obtained was 8.9.

Example 4

One hundred liters of water having 0.3 kg of sodium carbonate and 0.3 kg of monosodium phosphate dissolved therein was added to 3 kg of refined konjak flour, and the mixture was stirred for 5 to 10 minutes so that particles of the flour would not precipitate, thereby allowing the flour to swell in the solution. The resulting konjak paste was then allowed to stand for 3 hours at room temperature, thereby satisfactorily effecting swelling and dissolution of the konjak flour. The pH of the resulting konjak paste was 8.9.

The paste thus obtained was packed and sealed in a bag made of a synthetic resin material and then heated at 80° C. for 60 minutes. After the completion of the heat treatment, the packed paste was cooled in running water and further cooled to 10° C. in ice water, thereby obtaining the desired konjak jelly or thickened gel. The pH of the konjak jelly thus obtained was 8.4.

Example 5

One hundred liters of water was added to and mixed with 3.3 kg of refined konjak flour under stirring, thereby allowing the flour to swell in water. A solution of 1.0 kg of sodium carbonate in a small amount of water was added to and mixed with the resulting konjak paste. The pH of this mixture was 10.5.

The konjak paste thus obtained was packed and sealed in a bag made of a synthetic resin material and then heated at 70° C. for 15 minutes. After the heat treatment, the packed konjak paste was cooled rapidly to 10° C. in ice water, thereby obtaining the desired konjak jelly. The pH of the thickened gel thus obtained was 10.3.

Example 6

To four kilograms of refined konjak flour were added 0.5 kg of sodium citrate and 0.5 kg of sodium carbonate and mixed together. One hundred liters of water was added to the mixture and stirred for 5 to 10 minutes, thereby allowing the konjak flour to swell. The resulting konjak paste was allowed to stand for 3 more hours at room temperature, thereby satisfactorily effecting swelling and dissolution of the konjak flour. The pH of this konjak paste was 9.5.

The paste thus obtained was packed and sealed in a bag made of a synthetic resin material and then heated at 60° C. for 180 minutes. After the heat treatment, the packed paste was cooled in running water and further cooled to 10° C. in ice water, thereby obtaining the desired konjak jelly. The pH of the thickened gel thus obtained was 8.9.

Example 7

One hundred liters of water having 0.3 kg of L-lysine and 0.2 kg of sodium carbonate dissolved therein was added to and mixed with 4 kg of refined konjak flour under stirring, thereby allowing the konjak flour to swell. The resulting konjak paste was allowed to stand for 3 more hours, thereby satisfactorily effecting swelling and dissolution of the konjak flour. The pH of this konjak paste was 9.4.

The paste thus obtained was packed and sealed in a bag made of a synthetic resin material and then heated at 80° C. for 15 minutes. After the heat treatment, the packed paste was cooled rapidly to 10° C. in ice water, thereby obtaining the desired konjak jelly. The pH of the thickened gel thus obtained was 9.2.

Example 8

One hundred liters of water having 0.2 kg of L-lysine and 0.2 kg of disodium phosphate dissolved therein was added to and mixed with 3.3 kg of refined konjak flour under stirring, thereby allowing the konjak flour to swell. The resulting konjak paste was allowed to stand for 3 more hours at room temperature, thereby satisfactorily effecting swelling and dissolution of the konjak flour. The pH of this konjak paste was 8.8.

The paste thus obtained was packed and sealed in a bag made of a synthetic resin material and then heated at 80° C for 60 minutes. After the heat treatment, the packed paste was cooled rapidly in ice water, thereby obtaining the desired konjak jelly. The pH of the thickened gel thus obtained was 8.3.

Example 9

One hundred liters of water was added to a mixture of 3 kg of refined konjak flour and 0.35 kg of L-arginine under stirring, thereby allowing the konjak flour to swell. The resulting konjak paste was then allowed to stand for 2 hours at room temperature, thereby satisfactorily effecting swelling of the konjak flour. The pH of this paste was 9.1. The paste thus obtained was packed and sealed in a bag made of a synthetic resin material and then heated at 80° C. for 60 minutes. After the heat treatment, the packed paste was cooled to 10° C. in cold water, thereby obtaining the desired konjak jelly. The pH of the thickened gel thus obtained was 8.6.

Example 10

One hundred liters of water was added to a mixture of 2.8 kg of refined konjak flour, 0.2 kg of L-lysine and 0.2 kg of disodium phosphate, thereby allowing the konjak flour to swell. The resulting konjak paste was then allowed to stand for 3 hours, thereby satisfactorily effecting swelling of the konjak flour. The pH of this paste was 9.0. The paste thus obtained was packed and sealed in a bag made of a synthetic resin material and then heated at 80° C. for 45 minutes. After the heat treatment, the packed paste was cooled in cold water, thereby obtaining the desired konjak jelly. The pH of the jelly thus obtained was 8.5.

Example 11

One hundred liters of water was added to a mixture of 4 kg of refined konjak flour, 0.5 kg of sodium citrate and 0.5 kg of sodium carbonate, thereby allowing the konjak flour to swell. The resulting konjak paste was then allowed to stand for 3 hours at room temperature, thereby satisfactorily effecting swelling of the konjak flour. The paste thus obtained was packed and sealed in a bag made of a synthetic resin material and then heated at 80° C. for 15 minutes. After the heat treatment, the packed paste was cooled in cold water, thereby obtaining the desired konjak jelly. The pH of the thickened gel thus obtained was 8.8.

INDUSTRIAL APPLICABILITY

The konjak jelly or thickened gel according to the present invention is storable over a long period of time and has excellent properties as a processed food material. Accordingly, the konjak jelly may be added to various kinds of food for the purpose of calorie control, used as a binder, employed to impart to food the flavor and taste which are unique to konjak or to improve the properties of food, or it may be utilized as a food material. Thus, the konjak jelly or thickened gel of the present invention enables enlargement of the range of uses of konjak which has been attracting special interest recently.

We claim:

1. A process for producing a thermally irreversible thickened gel which is blendable with other food products, said process comprising the steps of:
   (a) forming a konjak past by mixing components consisting essentially of konjak flour, an amount sufficient of water to cause the konjak flour to swell and dissolve, and a basic amino acid, a basic salt, or mixture thereof;
   (b) heating said konjak paste under weak alkaline conditions at a temperature and time sufficient to begin the setting of said konjak paste, said temperature being about 60° C. or more, to thereby begin setting of said konjak paste; and
   (c) then, prior to completion of setting of said heated konjak paste, rapidly cooling the heated paste and thus stopping said setting prior to essential completion of said setting of said konjak paste into a firm gel.

2. The process according to claim 1, wherein one or more basic amino acids are employed with respect to the konjak flour.

3. The process according to claim 1, wherein one or more basic salts are employed with respect to the konjak flour.

4. The process according to claim 1, wherein a mixture of one or more basic amino acids and one or more basic salts is employed with respect to the konjak flour.

5. The process according to any one of claim 1, wherein said basic amino acid is one amino acid or a mixture of two or more amino acids selected from the group consisting of arginine, histidine, lysine, citrulline and ornithine.

6. The process according to claim 1, wherein said basic amino acid is arginine, lysine, or a mixture of arginine and lysine.

7. The process according to claim 1, wherein the basic amino acid is used in an amount of 1.25 to 15% by weight with respect to the weight of the konjak flour.

8. The process according to claim 1, wherein the basic salt is one salt or a mixture of two or more salts selected from the group consisting of sodium citrate, sodium tartrate, sodium malate, sodium acetate, sodium lactate, sodium succinate, sodium polyphosphate, sodium pyrophosphate, sodium metaphosphate, di- or tri-sodium phosphate, potassium polyphosphate, potassium pyrophosphate, potassium metaphosphate, or tripotassium phosphate, sodium carbonate, sodium hydrogencarbonate, potassium carbonate, calcium carbonate, magnesium carbonate, potassium sulfate, sodium sulfate, calcium sulfate, magnesium sulfate, sodium hydroxide, and potassium hydroxide.

9. The process according to claim 1, wherein an acid or an acid salt is used in combination with said materials in order to provide a buffer effect.

10. The process according to claim 1, wherein the amount of water which is added to the konjak flour is 20 to 40 times the amount of the latter.

11. The process according to claim 1, wherein said konjak paste is heated with the pH thereof adjusted so that the pH of the konjak jelly obtained after cooling is in the range of from 8.0 to 10.5.

12. The process according to claim 1, wherein said konjak paste is heated with the pH thereof adjusted so that the pH of the konjak jelly obtained after cooling is in the range of from 8.2 to 10.0.

13. The process according to claim 1, wherein said konjak paste is heated at from 60 to 95° C. for from 5 to 210 minutes.

14. The process according to claim 4, wherein said basic amino acid is one amino acid or a mixture of two or more amino acids selected from the group consisting of arginine, histidine, lysine, citrulline and ornithine.

15. The process according to claim 4, wherein said basic amino acid is arginine, lysine, or a mixture of arginine and lysine.

16. The process according to claim 4, wherein an acid or an acid salt is used in combination with said materials in order to provide a buffer effect.

17. A thermally irreversible thickened gel made by the process of claim 1.

18. A thermally irreversible thickened gel made by the process of claim 4.

19. A thermally irreversible thickened gel made by the process of claim 6.

20. A thermally irreversible thickened gel made by the process of claim 9.

* * * * *